United States Patent
Engh-Halstvedt et al.

(10) Patent No.: US 10,599,584 B2
(45) Date of Patent: Mar. 24, 2020

(54) WRITE BUFFER OPERATION IN DATA PROCESSING SYSTEMS

(71) Applicant: Arm Limited, Cambridge (GB)

(72) Inventors: Andreas Due Engh-Halstvedt, Trondheim (NO); Frank Langtind, Melhus (NO); Shareef Justin Jalloq, Cambridge (GB)

(73) Assignee: Arm Limited, Cambridge (GB)

(*) Notice: Subject to any disclaimer, the term of this patent is extended or adjusted under 35 U.S.C. 154(b) by 43 days.

(21) Appl. No.: 15/806,237

(22) Filed: Nov. 7, 2017

(65) Prior Publication Data

US 2019/0138458 A1 May 9, 2019

(51) Int. Cl.
*G06F 12/10* (2016.01)
*G06F 12/1045* (2016.01)
*G06F 12/0804* (2016.01)
*G06F 12/0891* (2016.01)
*G06F 12/0875* (2016.01)
*G06F 12/126* (2016.01)
*G06F 12/0895* (2016.01)

(52) U.S. Cl.
CPC ...... *G06F 12/1045* (2013.01); *G06F 12/0804* (2013.01); *G06F 12/0875* (2013.01); *G06F 12/0891* (2013.01); *G06F 12/0895* (2013.01); *G06F 12/126* (2013.01); *G06F 2212/50* (2013.01); *G06F 2212/683* (2013.01)

(58) Field of Classification Search
CPC ............ G06F 12/1045; G06F 12/0804; G06F 12/0875; G06F 12/0891; G06F 2212/50; G06F 2212/683
See application file for complete search history.

(56) References Cited

U.S. PATENT DOCUMENTS

| | | | |
|---|---|---|---|
| 6,577,305 B1 * | 6/2003 | Duluk, Jr. | G06T 1/60 345/419 |
| 2002/0062459 A1 * | 5/2002 | Lasserre | G06F 1/206 714/10 |

* cited by examiner

*Primary Examiner* — Reginald G Bragdon
*Assistant Examiner* — Edward Wang
(74) *Attorney, Agent, or Firm* — Vierra Magen Marcus LLP

(57) ABSTRACT

When writing data to memory via a write buffer including a write cache containing a plurality of lines for storing data to be written to memory and an address-translation cache that stores a list of virtual address to physical address translations, a record of a set of lines of the write cache that are available to be evicted to the memory is maintained, and the evictable lines in the record of evictable lines are processed by requesting from the address-translation cache a respective physical address for each virtual address associated with an evictable line. The address-translation cache returns a hit or a miss status to the write buffer for each evictable line that is checked, and the write buffer writes out to memory at least one of the evictable lines for which a hit status was returned.

18 Claims, 5 Drawing Sheets

WRITE BUFFER OPERATION IN DATA PROCESSING SYSTEMS

BACKGROUND

The technology described herein relates to data processing systems and in particular to cache operations in data processing systems.

Many data processing systems use caches to store data locally to a processing unit or units so as to reduce the need to fetch data from and/or write data to the main memory of the data processing system.

Caches may also be used as write buffers in order to hold data being written from the cache to the main memory, or at least to the next cache in the memory system hierarchy. In this way the processing units (which are typically fast) may be decoupled from the memory system (which is typically slow). For instance, when the cache is operating to perform a "write-back" cache operation, data to be written to the memory is passed from the processing unit to the write buffer (or cache), where it is temporarily stored, before being written to the main memory at an appropriate time. In this way, the number of write operations to the main memory may be reduced as the write-back cache holds the current copy of the data and the main memory is only updated when that data is evicted from the cache.

The data storage may be implemented using virtual memory. Thus, a data item to be read from or stored in the (main) memory may be associated with a virtual memory address which must be translated to a physical memory address in order to retrieve the data from or write out the data to the (main) memory. In order to speed up the retrieval, recent translations of virtual to physical memory addresses ("VA/PA translations") may be stored in an address-translation cache such as a translation lookaside buffer ("TLB"). So, when it is desired to write (or read, depending on the operation) data from the cache, a request may first be sent to the address-translation cache for the required physical address ("PA"). That is, whenever a virtual memory address is referenced during a write (or read) process, the address-translation cache may be checked for a quick reference to the associated location in physical memory, and if the required PA is present in the address-translation cache (a translation 'hit') the data may be written out to (or read from) the memory. On the other hand, when the address-translation cache does not contain the required VA/PA translation, so that a virtual memory address being searched in the address-translation cache is not found (a translation 'miss'), a request for the associated physical memory address must be sent to the system memory management unit ("MMU") which then retrieves the missing PA and the new VA/PA translation is stored in the address-translation cache for future use. In this event, the cache read or write operation may be stalled until the new VA/PA translation has been stored in the address translation cache.

In typical such operations, there may be strict requirements relating to the order in which the data is written to (or read from) the memory and various hazard checking rules for "reads" and "writes" to enforce this.

However, the Applicants have recognised that there can be situations where it is desired to write (e.g. write-back) cached data via an address-translation cache such as a TLB wherein the data can be written out in any order (in time). An example of this would be a write-only cache acting as a merging write buffer for a set of independent data streams in which each entry in a data stream will only be written to memory once, and the data streams will not be read until all writing has completed and all data streams are marked as complete. In this case, the data in the data stream may be written to the memory in any order (in time), as each write operation is thus independent of the next with no data sharing. One example of this situation may be when generating lists of "primitives" (also referred to as "polygons") for use in tile-based graphics processing systems.

The Applicants believe that there is room for improvements in such situations, e.g. when writing-back cached data to a memory via an address-translation cache such as a TLB where there is no requirement on the order in which the data is written to the memory.

BRIEF DESCRIPTION OF THE DRAWINGS

Various embodiments will now be described, by way of example only, and with reference to the accompanying drawings in which.

DETAILED DESCRIPTION

Figure 1:
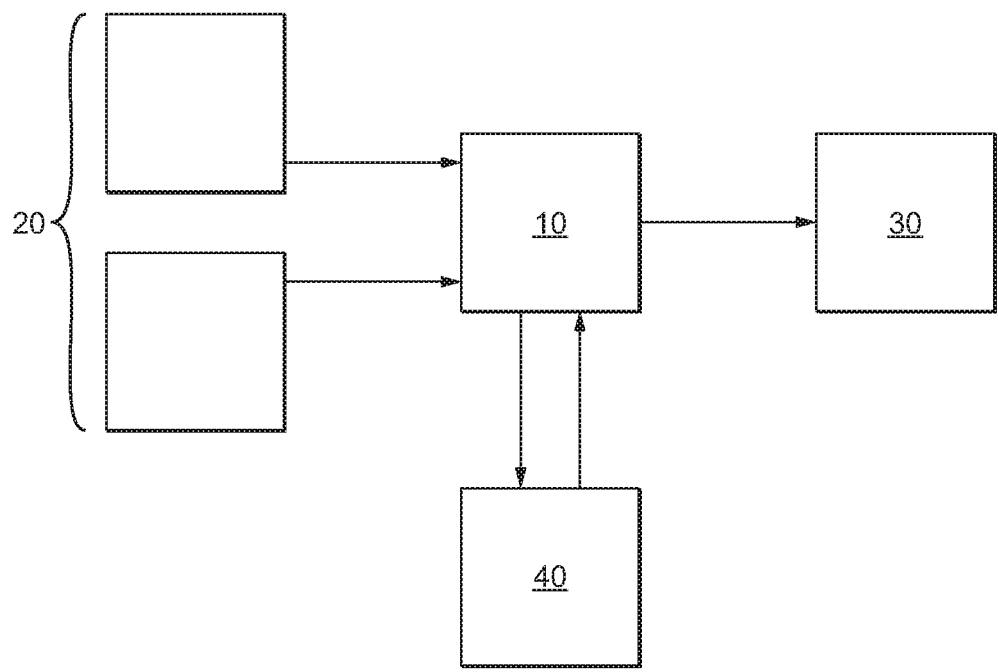
FIG. 1 shows schematically an example of a data processing system in which the technology presented herein may be used.

A first embodiment of the technology described herein comprises a data processing apparatus comprising:

a write buffer including a write cache containing a plurality of lines for storing data to be written to memory, wherein the write buffer maintains a record of a set of lines of the write cache that are available to be evicted to memory, each evictable line having an associated virtual address indicating where the data in the line is to be stored in memory; and an address-translation cache storing as virtual address to physical address translation entries a list of virtual address to physical address translations;

wherein the write buffer is operable to process the evictable lines in the record of evictable lines by requesting from the address-translation cache a respective physical address for each virtual address associated with an evictable line, wherein in the event that the respective virtual address to physical address translation is present in the address-translation cache, the address-translation cache returns a hit status to the write buffer, whereas in the event that the respective virtual address to physical address translation is not present in the address-translation cache, the address-translation cache returns a miss status to the write buffer; and wherein the write buffer is configured to write out to memory at least one of the evictable lines for which a hit status is returned.

Another embodiment of the technology described herein comprises a method of writing data to memory in a data processing apparatus that comprises a write buffer including a write cache containing a plurality of lines for storing data to be written to memory and an address-translation cache that stores as virtual address to physical address translation entries a list of virtual address to physical address translations;

the method comprising:

maintaining a record of a set of lines of the write cache that are available to be evicted to memory, each evictable line having an associated virtual address indicating where the data on the line is to be stored in memory; and processing the evictable lines in the record of evictable lines by requesting from the address-translation cache a respective physical address for each virtual address associated with an evictable line, wherein in the event that the respective virtual address to physical address translation is present in the address-translation cache, the address-translation cache returns a hit status to the write buffer, whereas in the event that the respective virtual address to physical address translation is not present in the address-translation cache, the address-translation cache returns a miss status to the write buffer; and in response to a hit status being returned for at least one of the evictable lines, writing out from the write buffer to memory at least one of the evictable lines for which a hit status is returned.

The Applicants have recognised that when writing (back) cached data to a memory via an address-translation cache such as a translation look aside buffer (TLB) using conventional systems, a translation miss may cause the write operation to stall until the missing virtual address to physical address (VA/PA) translation has been added to the address-translation cache. For instance, in conventional systems, the data in the cache is processed on a line by line basis with the data in each line being sent to the TLB, and processed thereby, in turn. In the event of a translation miss, the address-translation cache requests the missing physical address (PA) from the memory management unit (MMU) of the system, but because the data is transferred by the TLB (the TLB is part of the data path) the next line cannot be processed until the previous translation miss is resolved. Thus, even if the data being written has no ordering requirement, the need to add a missing VA/PA translation to the TLB in the event of each translation miss can, in effect, still force in-order processing since a new data item, i.e. cache line, cannot be processed until the previous one has been resolved so that a translation miss causes the process to stall until the missing VA/PA translation is retrieved. In other words, there is a potential bottleneck or latency in the data throughput when writing cached data via an address-translation cache using such systems. Since the missing VA/PA translation will generally need to be retrieved from the memory management unit (MMU), this latency may be significant, e.g. of the order of many thousands of cycles, depending on the memory system, and thus places severe backpressure on the system.

In situations where there is in fact no ordering requirement on the data being written (i.e. the data may be written to memory in any order (in time), e.g. since it will not be used until the data in the memory is complete), the conventional systems described above may therefore be highly inefficient.

The Applicants have further recognised that in situations where data of a set of data to be written to memory can be written to the memory in any order (in time), the lack of ordering requirement in the data may be exploited in order to reduce or hide this latency and improve the data throughput during the write process. The technology presented herein may thus reduce or hide at least some the latency associated with conventional systems, and in particular, may reduce a potential data throughput bottleneck associated with writing (back) cached data via an address-translation cache wherein the address-translation cache can stall due to a translation miss, e.g. where the cached data is written to a write-only cache and has no ordering requirement.

Particularly, according to the technology presented herein, a plurality of evictable lines may be processed by requesting from the address-translation cache (which may e.g. comprise a TLB) a respective VA/PA translation, with a translation hit/miss status being returned for each evictable line being processed. In this way, each evictable line in the current record of evictable lines that is maintained in the write cache (i.e. each line that is marked as being potentially available to be evicted) may thus be processed using the current list of VA/PA translations stored in the address-translation cache independently of the processing of the other evictable lines. That is, a hit/miss status may be returned for each of the evictable lines being processed, regardless of the result of the processing of the other evictable lines in the current set of evictable lines. Any evictable lines for which a hit status is returned may then be written out by the write buffer to memory. A translation miss on any of the evictable lines need not therefore prevent or delay the remaining evictable lines from being processed as it is no longer required to wait for the translation miss to be resolved before processing another (e.g. the next) evictable line. Thus, any lines for which a hit status is returned may be written out whilst the address-translation cache is being updated to add a missing VA/PA translation, or even during the processing of the other evictable lines in the record. Accordingly, at least some of the above-described latency may be hidden so that the data throughput is improved.

Furthermore, because it is no longer necessary to wait for the address-translation cache to be updated before processing the next line, each of the evictable lines in the record of evictable lines can be processed using the current entries in the address-translation cache, so that the address-translation cache may be used more efficiently, e.g. preventing a potential 'thrashing' of the entries in the address-translation cache that may occur in some conventional systems.

It will also be appreciated that because multiple evictable lines can be presented to the address-translation cache in a single iteration, e.g. using the current list of entries in the address-translation cache, the likelihood of there being a translation hit so that at least one evictable line may be written to memory may be increased allowing for better (i.e. more continuous) utilisation of the available bandwidth.

It will be appreciated that some of the performance bottleneck discussed above may be alleviated by using an address-translation cache with hit-under-miss functionality. However, this would require a significantly more complex address-translation cache as well as a large increase in (silicon) area to store a missing burst. Similarly, providing a larger write cache and/or address-translation cache, or providing a further buffer to implement a queuing system, may also help to mitigate this problem. However, again, these approaches would each require relatively larger and/or more complex caches to be used, and would anyway only shift the problem to higher data throughputs. By contrast, the technology described herein may be implemented using a relatively simple address-translation cache with a relatively lower area. Particularly, the technology may be implemented using an address-translation cache without hit-under-miss-functionality.

The write buffer includes a write cache for (temporarily) storing data that is to be written to memory. The write buffer also generally comprises an interface for communication with the address-translation cache, as well as various external interfaces e.g. for communication with the external processing units and the memory. The write buffer may also generally comprise a controller for controlling the operation of the write buffer. However, alternatively/additionally, an external controller may be provided in communication with the write buffer.

The write cache contains a set of plural cache lines for storing data that is to be written to memory. The data in the write cache may generally be received from one or more (external) processing units. The write cache may comprise a "write-only" cache. In embodiments, the write cache may be used to merge multiple data streams (i.e. as part of a merging write buffer). In any case, the data that is being written using the write buffer is generally data that will not be read until the (overall) write operation for the set of data (e.g. data stream) in question is complete and all of the data has been written to memory. Thus, as explained above, in an embodiment at least, the order (in time) in which the data is written to the memory from the write buffer does not matter.

The write cache maintains, at any given time, a record of a set of currently evictable lines, i.e. lines that have been identified as being available for eviction. In general, a line stored in the write cache may be identified and selected as being available for eviction (evictable) in any suitable manner. For example, a line may be selected as being evictable when the line is full, so that no further data may be written to the line. Similarly, because the data may typically be being written in a monotonically increasing manner, so that new data received by the write buffer will only ever be added to a line after any other data that is already in the line, a line may be selected as being evictable when the last part of the line is full (even if there is space available at the start of the line).

In order to help provide a more continuous data throughput, and (to try to) ensure that there are always cache lines available for writing new data to, one or more additional policies may be applied for selecting evictable lines (even if none of the lines, or the last parts thereof, are full, so that the lines would not otherwise be selected for eviction). For instance, one or more lines of the write cache may automatically be selected as being evictable in the event that the number of lines in the cache exceeds a certain threshold. The one or more lines selected in this way may be determined in various suitable ways. For example, the lines may be selected essentially randomly, or pseudo randomly, or based on any other suitable policy (such as first-in-first-out, or least-recently-used, etc.).

Each of the cache lines in the write cache is associated with a virtual address (VA), indicating where the data in the line is to be stored. Thus, in order to write the data stored in the cache lines to memory, the VAs associated with the cache lines must first be translated to a respective PA in the memory. An address-translation cache is thus provided that stores a list of such VA/PA translations as (individual) VA/PA translation entries within the address-translation cache. The address-translation cache may also store other associated data or attributes associated with the PA. For example, the address-translation cache may store information relating to the type of memory to which the PA relates. Thus, each VA/PA translation entry in the address-translation cache may comprise a VA field and a PA field, and optionally also a status field (as will be explained below), and an attribute field for storing any associated data or attributes.

The address-translation cache should and in an embodiment does include a plurality of entries that are available for storing different VA/PA translations. Initially, the entries may not contain any valid data (i.e. be "invalid"). However, in use, at least some of the entries store VA/PA translations that may be used during the write operation, as described herein. In general, the address-translation cache has at least two entries, e.g. so that one entry may be used whilst another entry is being updated. For instance, and depending on the context, the address-translation cache may typically include between about 4 and 1024 entries available for storing VA/PA translations.

The address-translation cache also generally includes an interface for communicating with the write buffer. The address-translation cache may e.g. comprise a translation lookaside buffer ("TLB"). For example, the address-translation cache may comprise a micro TLB (µTLB). The address-translation cache need not have hit-under-miss functionality, and in an embodiment does not.

The memory to which the data is being written may be a main memory (e.g. of a data processing system within which the data apparatus is being used), but may equally be any other suitable memory unit or cache in the memory hierarchy to which it is desired to write data.

According to the technology presented herein, the evictable lines in the record of evictable lines stored in the write cache are processed by the write buffer requesting, from the address-translation cache, the respective PA required for each of the VAs associated with the evictable lines (i.e. requesting a VA/PA translation). Upon such a request from the write buffer, the address-translation cache returns to the write buffer, for each evictable line being processed, either a hit status, indicating that the requested VA/PA translation is present in the address-translation cache so that the write buffer is able to write out the evictable line to memory, or a miss status, indicating that the requested VA/PA translation is not present i.e. so that the evictable line cannot be written to memory until the missing VA/PA translation is added to the address-translation cache.

Provided that a suitable address-translation cache is used, multiple evictable lines may be processed in parallel. However, generally, the evictable lines are processed in turn. That is, the write buffer may request a VA/PA translation from the address-translation cache for each of the evictable lines in the set of evictable lines in a sequential manner, so that each VA/PA translation request is presented to the address-translation cache, and a hit/miss status returned to the write buffer, in turn. The set of evictable lines in the write cache may thus be processed in turn until the complete set has been processed.

For any evictable line(s) for which a hit status is returned, those evictable line(s) may then be evicted and written out to memory using the associated PA. These evictable line(s) may be written out on the fly, e.g. as soon as a hit status is returned. Alternatively, e.g. to reduce the number of write instances to memory, multiple of (e.g.) all the evictable line(s) for which a hit status is returned during an instance of processing over a set of evictable lines may be written out together, i.e. after the full set of evictable lines has been processed.

The requested PA(s) may be sent from the address-translation cache to memory, or to a further downstream module between the write buffer and the memory, in parallel with the associated evictable line(s) being evicted from the write buffer, with the data in the evicted line(s) and the PA(s) being associated/processed together at the memory or downstream module. However, it will be appreciated that this may introduce an additional processing step, and therefore, in embodiments, for any evictable line(s) for which a hit status is returned, the address-translation cache also returns the requested PA (or VA/PA translation), optionally along with any associated data or attributes stored in the address-translation cache, to the write buffer, so that the write buffer is able to (directly) write out those evictable line(s) to memory.

It will be appreciated that the address-translation cache generally needs only to store the required VA/PA translations and process the requests from the write buffer, and does not therefore need to provide a data path, or hold any of the data (or indeed any information about the data, or the content thereof) that is being written to memory. Accordingly, in embodiments, the address-translation cache does not provide a data path and acts only to process the VA/PA translation requests from the write buffer, i.e. by returning the hit/miss status, in an embodiment along with the PA, and optionally any associated information stored in the address-translation cache, in the event of a translation hit.

Removing the address-translation cache from the data path may facilitate the independent processing of multiple evictable lines during a single iteration, so that a hit/miss status may be obtained for each evictable line regardless of the result of the processing of the other evictable lines that are being processed. Removing the address-translation cache from the data path may thus help to prevent the bottleneck described above. That is, because hit/miss statuses can be returned to the write buffer for each of the evictable lines within the record of evictable lines, the write buffer is able to continue processing evictable lines and write out any such evictable lines having a translation hit without having to wait for any translation misses to be resolved, and hence without stalling the write operation. Furthermore, it will be appreciated that removing the address-translation cache from the data path may be advantageous in itself as the processing requirements on the address-translation cache may be reduced, so that the overall system may be simplified with corresponding improvements in performance, power and area. That is, because the address-translation cache only needs to handle the VA/PA translation requests, a relatively smaller address-translation cache may be used whilst still providing sufficient throughput (although naturally it may be possible to further improve the throughput using a larger address-translation cache).

It will be appreciated that the list of VA/PA translations stored in the address-translation cache is dynamic, and may be updated to add (or remove) VA/PA translations as the write operation progresses. Thus, for an (or each) evictable line presented to the address-translation cache for which a miss status is returned, the address-translation cache may be updated to add the (missing) requested VA/PA translation to the list of VA/PA translations in the address-translation cache. That is, the list of entries in the address-translation cache may be updated in response to one or more evictable lines that have been processed returning a miss status.

It will be appreciated that the address-translation cache will only have a certain (finite) number of available entries. Thus, if there are multiple translation misses during a single processing run over the record of evictable lines, it may not be possible to add all of the missing VA/PA translations into the address-translation cache at the same time. In this case, the VA/PA translation requests may be processed in order, i.e. so that the first translation miss encountered during the processing of the record of evictable lines generates a request for an associated VA/PA translation whereas a second or subsequent translation miss does not, and that translation miss may then be processed on a subsequent processing (iteration) over the record of evictable lines.

In some cases, a record of prior translation misses may be maintained, and used to generate further requests for associated VA/PA translations once an entry in the address-translation cache becomes available.

However, provided that there is available space in the address-translation cache (e.g. an existing entry in the address-translation cache can be evicted, or there is currently a free (unallocated) entry in the address-translation cache), a translation miss may generate a request for the missing PA so that the new VA/PA translation can be added. By updating the address-translation cache to add a missing VA/PA translation in response to a miss status being returned for a particular VA, the cache line associated with that VA may then be evicted on a subsequent iteration over the record of evictable lines. Thus, where possible (i.e. so long as there is available space in the address-translation cache), the address-translation cache may be, and in an embodiment is, updated as and when address-translation cache misses occur. Thus, the address-translation cache can be updated to resolve a translation miss whilst the other entries in the address-translation cache are being used, helping to alleviate the bottleneck described above.

The write buffer is generally operable to iterate over the set of evictable lines wherein, during a single iteration, each evictable line in the record of evictable lines is processed until the current set of evictable lines has been processed to completion, i.e. so that a hit/miss status based on the current list of VA/PA translations stored in the address-translation cache has been returned independently for each of the evictable lines. That is, during a single iteration, the VAs associated with each of the current set of evictable lines may be checked against each of the current list of VA/PA translations stored in the address-translation cache. Subsequently, a further iteration may be (and in an embodiment is) performed over the current set of evictable lines, and the processing of the evictable lines may be repeated, and so on, until the write operation is complete and all of the (evictable) lines have been written out to memory.

In general, in embodiments of the technology described herein, each of the VA/PA translation entries within the address-translation cache that contains valid data is locked until that entry has been used at least once (or until the whole address-translation cache is invalidated, e.g. cleared or refreshed). That is, valid VA/PA translation entries stored in the address-translation cache may remain unavailable for eviction until they have been successfully used. Once a VA/PA translation has been used, i.e. once there has been a translation hit against that VA/PA translation for one of the evictable lines being processed during an iteration, that VA/PA translation entry may then be made available for eviction (and subsequently evicted to free up space to receive a new VA/PA translation in response to a translation miss). However, in embodiments of the technology described herein, any VA/PA translation entries within the address-translation cache that contain valid data which has not yet been used and for which there is a translation hit during an iteration remain locked until the end of that iteration. That is, the releasing of the VA/PA translation entries to be available for eviction in the event of a translation hit is deferred until the end of the processing of (iteration over) the current record of evictable cache lines. In other words, the virtual address to physical address translation data stored in any locked entries of the address-translation cache is not changed or removed until the end of an iteration. This will then ensure, for example, that two (or more) evictable lines within the record of evictable lines that are to be written to the same VA will all get to use the VA/PA entry in the address translation cache for that VA before that entry is evicted. This deferred "releasing" scheme may also help to avoid livelock situations that may otherwise be expected to occur, e.g. when attempting to process data out-of-order using conventional systems.

(By contrast, in conventional systems employing an address-translation cache such as a TLB, in which the TLB acts like a standard cache so that after each translation hit the TLB entries are validated and made available for eviction, if two evictable lines within the record of evictable lines are to be written to the same PA, the required TLB entry could be evicted in between processing these two lines, e.g. in response to an intervening translation miss, such that the TLB may need to be updated twice to fetch the same PA. Thus, the TLB entries are not used efficiently, and the write operation may result in thrashing of the TLB entries (i.e. having to perform multiple miss/fetch cycles for the same PA). Embodiments of the technology described herein can avoid this.)

The "locking" (and deferred releasing to be available for eviction) of the entries in the address translation cache in the above manner can be achieved in any suitable and desired manner. In an embodiment, this is done by being able to associate with any (and each) address translation cache entry a state (an "unlocking" state) that indicates that the entry should remain locked at present, but should be released (made available for eviction) at the end of the processing of (iteration over) the current record of evictable cache lines. Thus, it will be appreciated that although the virtual address to physical address translation data stored in the locked entries is not changed or removed until the end of the iteration, a state associated with the entry (e.g. and stored in a status field thereof) may be, and in an embodiment is, updated during the iteration.

Thus, in an embodiment, a (and each) address translation entry in the address translation cache can have associated with it (and be in) (at least) three states: a first ("locked") state in which the entry is "locked" in the address translation cache and cannot be removed or changed; a second ("unlocking") state that indicates that the entry should remain locked at present, but should be "unlocked" (made available for eviction) at the end of the processing of (an iteration over) a current record of evicted cache lines; and a third ("valid") state indicating that the entry is available for eviction, with the entries in the cache being handled and treated accordingly. Typically, a (and each) address translation entry in the address translation cache can also have associated with it (and be in) a fourth ("invalid") state, where no valid data is present in the entry, e.g. no VA/PA translation is stored. Optionally, a (and each) address translation entry in the address-translation cache may also have associated with it (and be in) a further ("allocated") state, where the entry has been allocated, and data is being fetched, but no valid data is yet present in the entry.

Correspondingly, in an embodiment, an address-translation cache entry can be (and is) moved from a first ("locked") state into a second ("unlocking") state during an iteration in the event of a translation hit, wherein in the second ("unlocking") state the entry in the address-translation cache remains locked and is not yet marked as being available for eviction (i.e. moved to a third ("valid") state) until the end of the iteration, at which time the address-translation cache entry is then moved from the second ("unlocking state") into the third ("valid") state and so may (then) be evicted and replaced). Entries in the address-translation cache in the "locked" state that are not used during an iteration, i.e. for which there are no translation hits, may remain in the first ("locked") state so that they remain in the address-translation cache until they are used (or until the address-translation cache is refreshed according to some other criteria, e.g. to free up space).

(By contrast, in conventional TLB systems, the entries would move directly from a locked state into a valid state in the event of any translation hit, so that the TLB entries may immediately be evicted and replaced (thus potentially preventing subsequent evictable lines being checked against that entry in the address-translation cache and potentially resulting in thrashing of the TLB). Or, in other conventional systems where the processing is performed entirely in-order, the TLB entries only move between valid and invalid states, with the process stalling completely in the event of a translation miss.)

An entry in the "locked" state can be caused to remain "locked" during an iteration after a "hit" on that entry in any suitable and desired manner. In an embodiment, a control signal ("lock" signal) that can be applied (or not), e.g. to the address-translation cache, is used for this purpose, with the state of the "lock" signal in an embodiment then controlling the transitions between states of entries in the address-translation cache. Thus, in embodiments, a "lock" signal may be, and in an embodiment is, asserted at the start of an iteration that prevents entries of the address-translation cache from moving from the first ("locked") state into the third ("valid") state. In particular, when the lock signal is asserted (or "high"), any entries of the address-translation cache for which there is a translation hit may be moved from the first ("locked") state into the second ("unlocking") state, as described above. At the end of the iteration, the lock signal may then be de-asserted to cause any entries in the "unlocking" state to move into the "valid" state. (In case there is a translation hit for an entry of the address-translation cache and the lock signal is not asserted (or is "low"), the entry may move directly from the first ("locked") state into the third ("valid") state. The "lock" signal is thus in an embodiment asserted at the start of an iteration in order to prevent any entries currently in the first ("locked") state from moving into the third ("valid") state during the iteration, so that each entry may be used multiple times during a single iteration).

The address-translation cache entries may be held in an "invalid" state when they are not currently storing any valid data, i.e. when no valid VA/PA translation is stored. The current status of each of the address-translation cache entries may be stored in a suitable status field for the entry.

As discussed, in response to the address translation cache returning a hit status to the write buffer for one or more of the evictable cache lines that have been checked against the address translation cache, the write buffer will operate to write out to the memory at least one of the evictable lines for which a hit status is returned. In the case where plural evictable lines have a hit status, the process operates in an embodiment to write out plural of, and in an embodiment all of, the evictable lines that have a hit status. As discussed above, this could be done by writing out all of the evictable lines that have a hit status in turn (one after another), or, e.g., by writing out all of the evictable lines that have hit status together, e.g. depending upon how the write buffer is configured.

In an embodiment, the write buffer receives the hit or miss status for all of the evictable lines in the set of evictable lines from the address translation cache, and then selects (at least) one of the evictable lines that returned a hit status for writing out to memory (and writes that line out to memory). The write buffer may then select another evictable line having a hit status (if any) and write that line out to memory, and so on, until all the evictable lines having hit status have been written out. Alternatively, the write buffer could simply write out one evictable line that had a hit status, and then re-process the new set of evictable lines in the manner of the technology described herein to identify a next evictable line to write out to memory, and so. Various suitable techniques are contemplated for determining which evictable lines having a hit status are written out. For instance, evictable lines having a hit status may be selected to be written out using e.g. a find-first-one, round-robin, or pseudo-random technique.

Once a line has been written out to memory, then the record of evictable lines is in an embodiment updated accordingly (so as to remove the written out line from that record).

Correspondingly, any evictable lines for which a miss status is returned should, and in an embodiment do, remain in the record of evictable lines (for trying again later).

Thus, the set of evictable lines is (in an embodiment) dynamic and updated in use, e.g. in an embodiment in response to lines being written out from the write cache, and/or in response to new data being written into the write cache. Various techniques are contemplated for maintaining the set of evictable lines, and selecting lines as being evictable, as explained above.

In the event that none of the current set of evictable lines returns a hit status from the address translation cache, then none of the evictable lines will be written out from the write buffer to the memory, but rather all the evictable lines will remain in the record of evictable lines for later checking against the address translation cache again (e.g. once one of the address translation misses has been fetched into the address translation cache).

The operation in the manner of the technology described herein may and in an embodiment does continue until all the desired data for the set of data (e.g. data stream) in question that is being written to the memory via the write buffer has been written to the memory. Correspondingly, if there is more than one set of data that is being written to memory via the write buffer, then the operation in the manner of the technology described herein may continue until all of the sets of data in question have been completely written to the memory.

In an embodiment, the write buffer of the technology described herein (and the operation in the manner of the technology described herein) is used for all data that is being written to the memory via the write buffer.

Thus, the write operation may be complete when all of the lines in the write cache have been written to memory and when no new data is being written into the write cache.

The write buffer may continuously iterate over the set of evictable lines so that the evictable lines are continuously processed. However, e.g. to improve power consumption, in embodiments, the write buffer only processes the evictable lines in response to a triggering event, and particularly that the processing (i.e. an iteration over the (current) set of evictable lines) is only triggered when there is a possibility of new lines being evicted to memory. A new iteration may thus be triggered in various suitable ways.

For example, a further iteration may be triggered in response to new data becoming available such as an update either to the record of evictable lines maintained by the write cache or to the list of VA/PA translations stored in the address-translation cache. For instance, if there is a new entry in the address-translation cache, e.g. a new VA/PA translation being added to the list of stored VA/PA translations in response to a prior translation miss, it is likely that at least one of the evictable lines (i.e. at least the one that caused the prior translation miss) will hit against the new VA/PA translation. That is, because any evictable lines for which a miss status was returned will generally remain in the record of evictable lines, as, and in an embodiment when, the address-translation is updated, the set of evictable lines may be processed again (in a second or further iteration) and so on to continue writing out the evictable lines until the write operation is complete. Thus, when a new entry is added into the address-translation cache, a corresponding address-translation cache "linefill" signal may be sent to the write buffer to indicate this, and to trigger a further iteration.

Similarly, if a new line becomes available for eviction, there is a possibility that this will hit against one of the list of VA/PA translations stored in the address-translation cache, and so a further iteration may be triggered.

A further iteration may also be triggered in the event that there is a translation hit during the previous iteration. This may help to prevent a deadlock situation which may otherwise occur, especially due to the locking of the address-translation cache during the iteration.

Thus, in an embodiment, the processing of the recorded set of evictable lines by the write buffer is in an embodiment performed (only) in response to a triggering event, with the triggering events that can trigger the processing of the set of evictable lines in an embodiment comprising one or more of, and in an embodiment all of:

a hit in the address translation cache during a previous processing sequence of the set of evictable lines;

a new entry being added into the address translation cache; and a new line becoming available for eviction in the write cache.

Other triggering events could be used if desired.

The data processing apparatus will generally be provided as a part of a data processing system further comprising one or more processing units and a memory. For instance, the data that is stored in the cache lines of the write cache may generally be written to the write cache by the one or more processing units. The processing units and memory are generally external to the data processing apparatus. This data is therefore generally received by a first respective external interface of the write buffer for communicating with the one or more processing units, and then added into the write cache. In turn, the data stored in the cache lines is written out from the write cache to the memory, e.g. in the manner described above, e.g. via a second respective interface of the write buffer for communicating with the memory.

The write buffer thus acts as a buffer between the (relatively fast) processing units and the (relatively) slow memory. In embodiments, the write buffer may receive data from multiple different processing units, and may thus be used as a merging write buffer, to merge multiple data streams from multiple processing units (e.g., and in an embodiment, into a single data stream (set of data) in the memory).

The technology described herein accordingly also extends to a data processing system comprising the write buffer arrangement (data processing apparatus) of the technology described herein, and to a method of operating such a data processing system in the manner of the technology described herein.

Thus, another embodiment of the technology described herein comprises a data processing system comprising:

one or more processing units operable to generate a set of data for storing in memory;

a memory for storing data generated by the data processing unit or units; and a write buffer operable to receive and store temporarily data from the data processing unit or units and to write data received from a data processing unit out to the memory; and an address-translation cache storing as virtual address to physical address translation entries a list of virtual address to physical address translations;

wherein:

the write buffer:

includes a write cache containing a plurality of lines for storing data from a data processing unit to be written to memory, and maintains a record of a set of lines of the write cache that are available to be evicted to memory, each evictable line having an associated virtual address indicating where the data in the line is to be stored in memory; and is operable to:

process the evictable lines in the record of evictable lines by requesting from the address-translation cache a respective physical address for each virtual address associated with an evictable line, wherein in the event that the respective virtual address to physical address translation is present in the address-translation cache, the address-translation cache returns a hit status to the write buffer, whereas in the event that the respective virtual address to physical address translation is not present in the address-translation cache, the address-translation cache returns a miss status to the write buffer; and to write out to memory at least one of the evictable lines for which a hit status is returned.

Subject to the particular arrangements and embodiments of the technology described herein described herein, the looking up of data in the caches and the buffer, and the writing of data into and from the caches, etc., can otherwise be performed in any suitable and desired manner, such as, and in an embodiment, in the normal manner for cache look-ups and data transfers in the data processing system in question.

The technology described herein can be used for any suitable and desired data transfers to memory. As discussed above, the technology described herein is particularly applicable to the writing of data having no order requirement (in time) to a memory when using virtual to physical memory address translations. Thus in an embodiment at least, the technology described herein is used when writing data to memory that will not be read until the write operation is complete (until the complete set of data has been written to memory), and for which the data may be written to memory in any order (in time).

As discussed above, a particular form of data for which the technology described herein is particularly applicable is the generation of tile lists (primitive lists) in tile-based graphics processing systems. Thus, in an embodiment, the data processing apparatus is implemented in a graphics processing system (and the data processing system is a graphics processing system) comprising, inter alia, the data processing apparatus of the technology described herein, and a graphics processing unit or units that is operable to generate graphics data for storing in memory and to write that data to the write cache of the data processing apparatus for transferring therefrom to the memory in the manner of the technology described herein.

Thus, in an embodiment, the data processing system is a graphics processing system, and, correspondingly, the data that is being transferred to memory via the data processing apparatus of the technology described herein is graphics processing data.

In this case, the data that is being generated by the graphics processing unit(s) and that is transferred to memory in the manner of the technology described herein in an embodiment comprises primitive (polygon) lists for use by later stages of the graphics processing pipeline that the graphics processing unit(s) executes.

In this case, the graphics processing unit will comprise a tiler (a tiling stage) that is operable to determine primitives that need to be processed for respective sub-regions (areas) of an overall graphics processing (render) output, such as a frame to be displayed, that is being generated, and will write respective lists of primitives for the sub-regions that the graphics processing (render) output has been divided into. In this case, the data that is being written to the memory will comprise a list or lists of primitives to be processed for respective sub-regions (areas) of the overall render output. The lists may identify the primitives by, e.g., reference to respective identifiers for the primitives, or by reference to their vertices, or in any other suitable or desired way.

As well as including a tiler (tiling stage), the graphics processing unit in these arrangements may otherwise comprise any suitable and desired processing elements and units that a graphics processing unit may comprise, such as, for example, and in an embodiment, one or more or all of: a rasteriser, a renderer (a fragment shader), one or more depth and/or stencil testers, a blender, tile buffers, a write-out unit, etc.

In an embodiment, the data processing apparatus and/or system (e.g. graphics processing system) comprises, and/or is in communication with, one or more memories and/or memory devices that store the data described herein, and/or that store software for performing the processes described herein. The data processing apparatus and/or system may also be in communication with a host microprocessor, and/or with a display for displaying images based on the output of the data, e.g. graphics, processing system.

The technology described herein can be implemented in any suitable data processing system that uses caches, such as a suitably configured micro-processor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, units, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Subject to any hardware necessary to carry out the specific functions discussed above, the data processing apparatus and system can otherwise include any one or more or all of the usual functional units, etc., that data, e.g. graphics, processing systems include.

It will also be appreciated by those skilled in the art that all of the embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processor. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with the data processor the processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

FIG. 1 shows schematically an example of a data processing system in which the technology described herein may be used. In this system a write buffer 10 is disposed between a plurality of processing units 20 and a memory system 30. In particular, the write buffer 10 is acting to write-back a plurality of data streams presented by the processing units 20 to the memory system 30. That is, the write buffer 10 is generally acting as a merging write buffer acting to merge the data streams from the plurality of processing units 20. The data streams from the different processing units are independent of each other. Each data stream forms a contiguous list of data entries with each entry being written to a cache 12 (see FIG. 2) of the write buffer 10 in a monotonically increasing manner. Each entry will thus only be written once. It is also assumed that the data streams will not be read from the memory until all writing has completed and all the data streams are marked as complete and that all of the data will thus remain valid until the end of the write operation when the system is flushed so that a new operation may be started. Each write operation is therefore independent of the next with no data sharing.

In this type of situation, where the data being written to the memory 30 is not being used in real time, there is no particular requirement for the data to be written to the memory system 30 in order (in time). There are various examples of situations where this may be the case and it will be appreciated that the technology presented herein may generally find application in any such situation. For instance, one example would be when generating list of primitives for use within a tile-based graphics processing system since the lists of primitives are built only for later use, and will not be used until complete. It will be appreciated that each list of primitives may extend over several cache lines in the write buffer 10, with cache lines being evicted if full, or as necessary to free up cache space to allow the write buffer 10 to continue handling new data. It will be appreciated that in this situation the cache may be relatively stressed as there are potentially a large number of bits to be written, in an essentially random order, over a relatively large region of memory.

The technology presented herein is generally concerned with such situations, e.g. of the type described above, wherein there is no ordering requirement in the data, so that the data stored in the cache lines may be written to memory in any order. The Applicants have recognised that the lack of any ordering requirement in the data may be exploited in order to improve the performance of the write operation in a manner that will be explained in further detail below.

Figure 2:
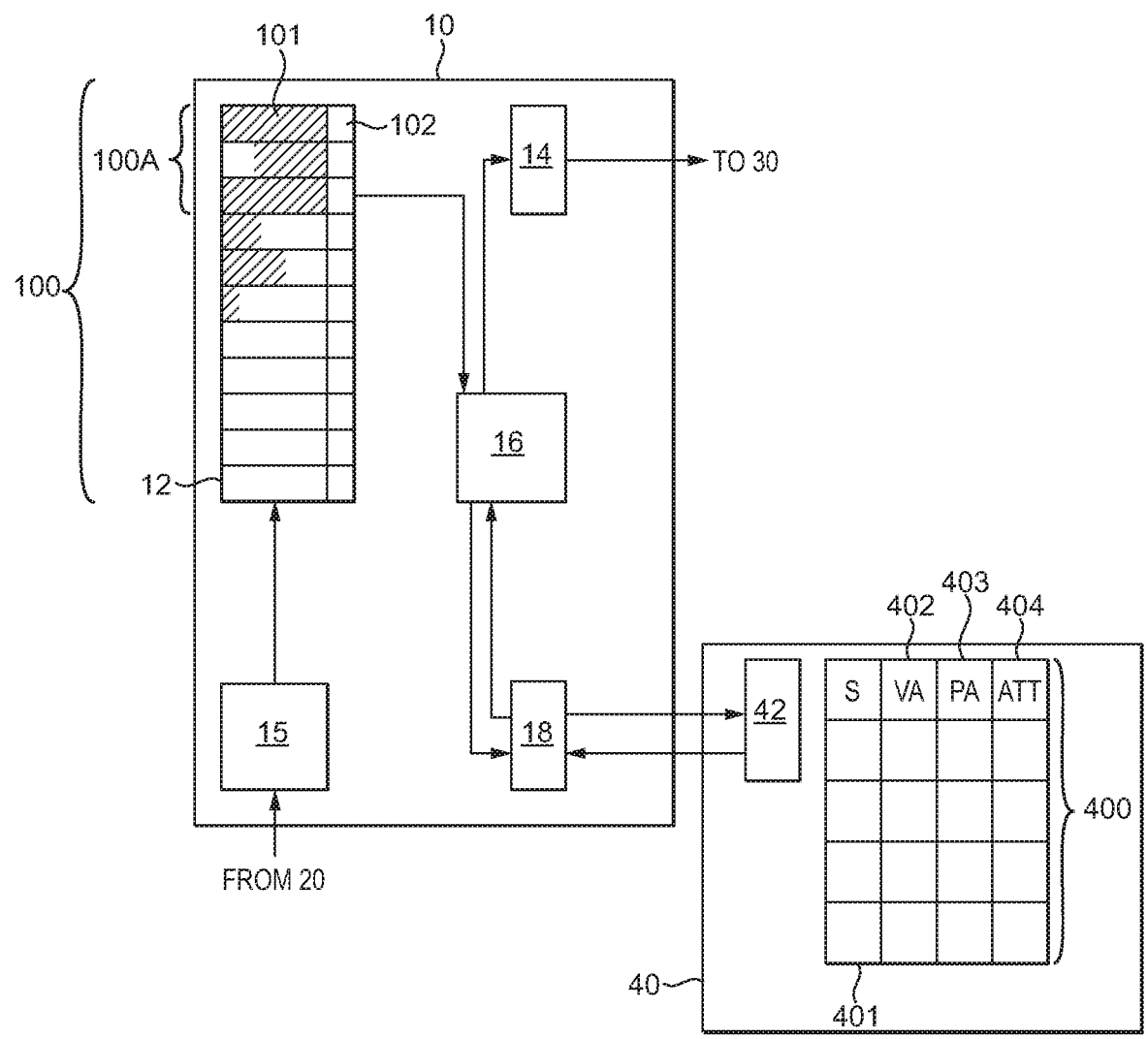
FIG. 2 shows in more detail the components of an embodiment of the data processing apparatus of the technology described herein.

As shown in FIG. 2, the write cache 12 of the write buffer 10 generally stores data in a set of cache lines 100. The data from the processing unit(s) 20 may be sequentially written to the different cache lines 100, e.g. in the manner described above. The data storage is implemented using virtual memory techniques, so that each of the cache lines 100 has an associated virtual address (VA) identifier 102, and when a cache line is to be evicted from the cache 12, it must be written to a memory unit of the memory system 30 using a VA to physical address (PA) translation from an address-translation cache such as a translation lookaside buffer (TLB).

In a conventional system (not shown), the write buffer would write one cache line at a time to the TLB which would then perform the required VA/PA translation and write the line to the correct PA in the memory. The TLB thus forms part of the data path. However, especially where the TLB does not support hit-under-miss functionality, so that the TLB can only service one request (cache line) at a time, because the TLB forms part of the data path, any translation miss will stall the write operation while the TLB performs a memory management unit (MMU) request to fetch the missing TLB entry. The TLB therefore effectively forces in-order behaviour onto the system and the write operation is stalled in the event of a TLB miss even though there may be other cache line entries that are available for eviction that would hit in the TLB. This latency may be of the order of many thousands of cycles depending on the memory system and can place severe backpressure on the data processing system. The conventional approach may therefore be highly inefficient in situations when there is in fact no ordering requirement for the data being written. This problem may be alleviated in part by increasing the size of the write buffer or of the address-translation cache, or by using an address-translation cache with hit-under-miss functionality, in order to reduce the likelihood of a stall. However, these approaches are still relatively inefficient, and also require a relatively more complex address-translation cache and a larger cache area.

According to the technology presented herein the arrangement of the address-translation cache is modified so that the lack of ordering characteristic of the data may be exploited in order to hide the latency associated with a translation miss and to improve the write data throughput to the memory. In this way, the performance may be improved without having to add a further or larger buffer into the system, allowing for a relatively simple address-translation cache to be used, and allowing for various resulting performance, power and area improvements.

Particularly, as shown in FIGS. 1 and 2, the address-translation cache 40, which may e.g. comprise a TLB, is arranged relative to the write buffer 10 such that the address-translation cache 40 has no data path, and instead only acts to process requests for VA/PA translations from the write buffer 10. Thus, the address-translation cache 40 in FIGS. 1 and 2 communicates with the write buffer 10 but does not write any data itself to the memory 30.

FIG. 2 shows in more detail the interface of the write buffer 10 and the address-translation cache 40 of FIG. 1. In particular, as shown in FIG. 2, the write buffer 10 includes a write cache 12 including a plurality of cache lines 100. The cache lines 100 are populated with data 101 received from the processing unit(s) 20 via a respective interface portion 15 of the write buffer 10. The cache lines 100 are also each associated with a VA identifier 102.

At any given time during the write operation the write cache 12 of the write buffer 10 therefore contains a plurality of cache lines 100 storing data 101 that is being received from the processing unit(s) 20. In order to allow new data to be written to the write cache 12, the data 101 that is stored in these cache lines 100 must ultimately be evicted and written out to the memory 30. For instance, in the case of a write-back situation of the type described above, it is known that ultimately all of the cache lines should be written out to memory 30.

Accordingly, the write cache 12 maintains, amongst the full set of cache lines 100, a dynamic record of a subset of evictable lines 100A that are currently available to be written out to memory 30 (i.e. evicted). The cache lines 100 that are selected to be evicted, and thus added to the record of evictable lines 100A, may be selected in various suitable ways. For instance, in the situation described above, wherein data is being written in a monotonically increasing manner to sequential addresses so that data is not written to the same VA multiple times, and once data has been written to the last part of the line there is no possibility of jumping back to the start of the line, lines may be selected as being 'evictable' where the line is full, or wherein the final part of the line has been written to (so that there is no room to add further data at the end of the line).

Additionally, in order to avoid stalling of the data throughput due to the write cache 12 becoming full, the system may set a threshold for the number of lines that are stored in the cache at any time, wherein once the number of lines exceeds the threshold, lines are made available for eviction (even if they are not full, or part-full) to ensure that there are always some evictable lines. In this case, the lines that are made available for eviction may be selected in any suitable manner, for instance, the lines may be selected randomly, or e.g. based on a first-in-first-out, or least-recently-used, protocol.

The write buffer 10 may further include a suitable controller 16, and a suitable interface 15 for communicating externally with the processing unit(s) 20. Although illustrated in FIG. 2 as separate units, it will be appreciated that any of the components of the write buffer 10 may be implemented together using shared circuitry or processing power. Similarly, it will be appreciated that one or more of these components may be provided externally to the write buffer 10. For example, an external controller may be provided in communication with the write buffer 10.

In order to evict an evictable line from the set of evictable lines 100A, it is necessary to obtain the associated PA from the address-translation cache 40. The address-translation cache 40 thus comprises a list of entries 400 wherein each entry in the address-translation cache generally includes a VA 402 and an associated PA 403 (i.e. a VA/PA translation), along with any other attributes 404 associated with the PA 403. Each of the entries 400 also contains a status field 401, the purpose of which will be explained below.

So, when the write buffer 10 wants to write out one of the evictable cache lines 100A having an associated VA 102, a request is sent via an interface portion 18 of the write buffer 10 to a corresponding interface portion 42 of the address-translation cache 40 in order to look up the requested VA 102 among the VAs 402 stored in the address-translation cache 40. If the requested VA 102 is present in the address-translation cache 40, the address-translation cache 40 may return a hit status flag to indicate that the required VA/PA translation is present in the address-translation cache 40, and then return the associated PA 403, along with any associated information 404, to the write buffer 10 via the interface portion 42. The write buffer 10 is then able to write out the evictable line to memory 30 via a suitable external memory interface 14. On the other hand, if the requested VA 102 is not present in the address-translation cache 40, the address-translation cache 40 may return a miss status flag to indicate this, and the associated evictable line may remain in the record of evictable lines 100A. If there is a free entry in the address-translation cache 40, the address-translation cache 40 may subsequently be updated to add the missing VA/PA translation to the list of entries 400 stored in the address-translation cache, e.g. by requesting the missing VA/PA translation from the MMU.

Thus, it will be appreciated that the address-translation cache 40 merely acts to process the VA/PA translation requests from the write buffer 10, and does not provide any part of the data path. Each of the evictable lines 100A in the write cache 12 may thus be processed in turn, and independently of one another, using the address-translation cache 40 without having to pass the data that is being written through the address-translation cache 40. Thus, no information relating to the data content of the cache lines needs to be stored in the address-translation cache 40 potentially freeing up the address-translation cache 40 to be able to process multiple VA/PA translation requests in a more efficient manner, whilst also reducing the burden on the address-translation cache 40. This may allow for various improvements in the processing of the data, thus reducing or hiding the latency associated with the conventional system described above.

Particularly, because the address-translation cache 40 does not form part of the data path, and instead only handles the VA/PA translation requests from the write buffer 10, the write operation need not be interrupted in the event of a translation miss. Thus, the write buffer 10 may present multiple VAs associated with multiple different evictable lines 100A to the address-translation cache 40 in series and collect the translation hit/miss statuses for each evictable line 100A independently of the result of the processing of the other evictable lines 100A.

For any evictable lines 100A that hit in the address-translation cache 40, the requested VA/PA translation may be returned to the write buffer 10, and the evictable lines 100A moved to the external memory interface 14 of the write buffer 10 ready for eviction to the memory 30. The write buffer 10 is then able to write out these evictable lines directly to the relevant PA in the memory 30.

Any evictable lines 100A that miss in the address-translation cache 40 remain in the set of evictable lines stored in the write cache 10. In the event of a translation miss the address-translation cache 40 will still have to fetch the missing PA in order to evict the line, as in the conventional system, but because the address-translation cache 40 is removed from the data path, the write operation is not stalled whilst waiting for the missing PA(s) to be added to the address-translation cache 40, since the write buffer 10 can continue to write to memory any evictable lines that have hit in the address-translation cache 40.

During a write operation, the write buffer 10 iterates over the set of evictable lines in the record maintained in the write cache 12, wherein an iteration is generally a multi-cycle process wherein each of the evictable lines in the write cache 12 is processed, e.g. in turn, with one line being presented per cycle to the address-translation cache 40.

Figure 3:
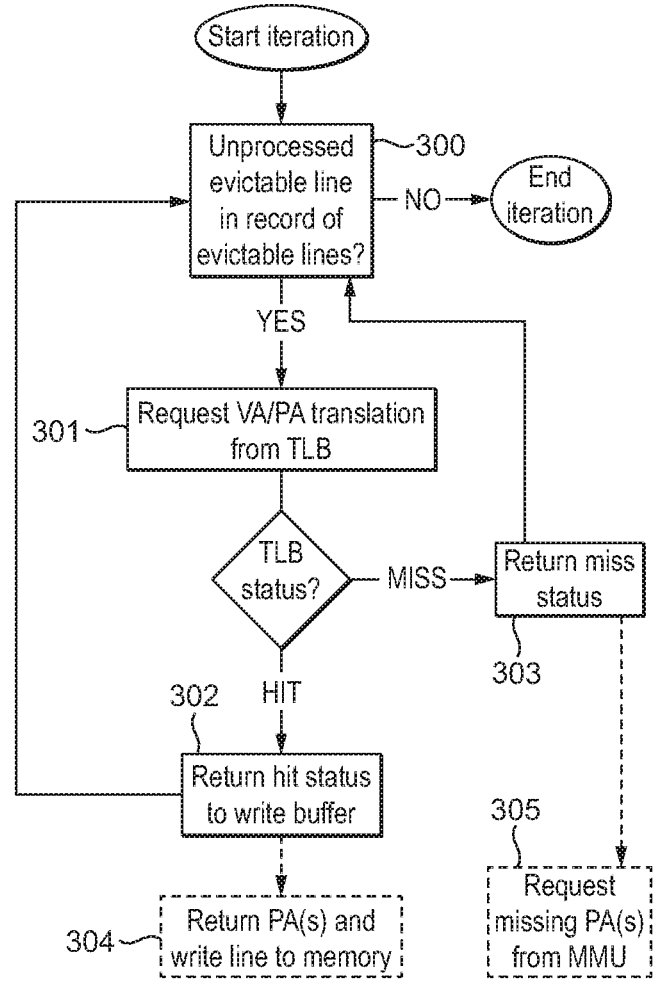
FIG. 3 is a flowchart illustrating how evictable lines may be processed according to the technology presented herein.

FIG. 3 is a flowchart illustrating how the evictable lines are processed by the write buffer 10/address-translation cache 40 during a single iteration.

Although in FIG. 3 each evictable line is processed in turn, it will be appreciated that this need not be the case, and that multiple evictable lines may in principle be presented in parallel provided that a suitable address-translation cache 40 and interface is provided. Also, it will be appreciated that the evictable lines need not be processed by the address-translation cache 40 in any particular order (although generally the write buffer 10 will process the lines according to the order in which they are stored in the record—for instance, the lines may be processed in the order in which they have been added to the record of evictable lines 100A).

Thus, at step 301, after determining, at step 300, that there is an evictable line within the record of evictable lines 100A stored in the write cache that has not yet been processed during the iteration, a request for the VA/PA translation associated with that line is sent to the address-translation cache 40 (which may e.g. be a TLB, as shown in FIG. 3). That is, at step 301, the write buffer 10 requests from the address-translation cache 40 the VA/PA translation required for the VA associated with the evictable line that is being processed. In the event that the requested VA/PA translation is present in the address-translation cache 40 (a translation hit), the address-translation cache 40 returns a hit status flag to the write buffer 10 (step 302). On the other hand, in the event of a translation miss, the address-translation cache 40 returns a miss status flag to the write buffer 10 (step 303). In either case, regardless of the hit/miss status of the current line, the write buffer 10 then proceeds to process the next evictable line in the record of evictable lines 100A, and so on, until the set of evictable lines has been completely processed and there are no further evictable lines to process, at which point the iteration ends.

For any evictable lines having a translation hit, the address-translation cache 40 also returns to the write buffer 10 the requested PA, optionally along with any other associated data or attributes stored in the address-translation cache. The evictable line along with its associated PA may then be moved to the external memory interface 14 of the write buffer 10 from which it is then written out to the memory system 30 (step 304). The lines for which a hit status is returned may be written out immediately after (or substantially at the same time as) the hit status is returned in step 302, as illustrated in FIG. 3, so that each evictable line having a translation hit is written out on the fly as and when a hit status is returned. However, although not shown, it will be appreciated that step 304 may also, or alternatively, be performed at the end of the iteration, i.e. only after all of the evictable lines have been processed, so that all of the evictable lines may be processed and written out together in a single step.

For any evictable lines having a translation miss, the evictable line remains in the set of evictable lines 100A stored in the write cache 12. The address-translation cache 40 may request from the MMU the missing PA and the address-translation cache 40 may be updated accordingly to add the new VA/PA translation (step 305). So long as there is an available entry in the address-translation cache 40 a request for a missing PA may be sent to the MMU as soon as a translation miss status is returned (i.e. during the iteration, after step 303). However, the apparatus is able to continue the write operation using the other VA/PA translations stored in the address-translation cache whilst waiting for the missing VA/PA translation to be fetched and the translation miss does not therefore stall the write operation. In an embodiment, the address-translation cache 40 entries are therefore updated as and when translation misses occur, provided that this is possible, i.e. that there is available space in the address-translation cache 40. However, it is also contemplated, in some cases, that the address-translation cache 40 entries may be updated after the iteration is complete, so that the address-translation cache 40 is only updated after each of the evictable lines has been processed (in this case a separate list of prior misses may be maintained which is only processed at the end of the current iteration).

In general, the VA/PA translation entries stored in the address-translation cache 40 are locked, and remain unavailable for eviction, until they have been successfully used. That is, only once an entry has been used, i.e. in the event of a translation hit against that entry, may that entry made available for eviction (and subsequently evicted in order to free up space for a new VA/PA translation). However, importantly, any VA/PA translation entries stored in the address-translation cache 40 that have not previously been used (i.e. have not been used prior to the start of an iteration) remain locked and unavailable for eviction for the duration of the iteration. Thus, where an entry of the address-translation cache 40 is locked, that VA/PA translation remains unavailable for eviction until the iteration has finished, so that such entries may only be released to be available for eviction (so that they can be replaced with new VA/PA translations) at the end of the iteration, once each of the evictable lines has been processed (in the iteration in question). In this way, it is ensured that each of the current set of evictable lines 100A can be processed against each of the VA/PA translations in the address-translation cache 40 that have not previously been used. This deferred releasing scheme may also help to prevent potential livelocks that could otherwise occur. An implementation of the deferred releasing scheme will be described in more detail below in relation to FIG. 4.

The iteration is complete once all of the evictable lines have been processed in this way. Thus, the scheme presented in FIG. 3 ensures that all of the evictable lines can be processed in a single (and in each) iteration so that any evictable lines that hit in the TLB 40 can then be written out from the write cache 10 to memory. That is, because the scheme continues to process all of the evictable lines, even if a translation miss is encountered, a translation miss does not stall the write-back operation as would be the case for conventional systems writing-back cached data via a TLB. Furthermore, because all of the evictable cache lines can be processed using the current list of entries 400 stored in the address-translation cache in a single iteration in a single iteration, before the entries in the address-translation cache are updated, the likelihood of there being at least one hit (or multiple hits) is increased, allowing for an improved utilisation of the available bandwidth i.e. because lines may be evicted more continuously (without having to wait on a previous miss). Further still, because multiple evictable lines are processed in a single iteration, with each evictable line being checked against the current list of entries 400 stored in the address-translation cache, the entries in the address-translation cache may be used more efficiently.

By way of example, consider a TLB having a single entry 400-1, and a write cache containing four evictable lines 100A-1, 100A-2, 100A-3 and 100A-4, wherein the first and third lines both hit to the same first page, 'A', and thus require the same (first) VA/PA translation, whereas the second and fourth lines hit to the same second page, 'B', requiring a second VA/PA translation, e.g.:

| Cache line | Page |
|------------|------|
| 100A-1     | A    |
| 100A-2     | B    |
| 100A-3     | A    |
| 100A-4     | B    |

Initially, the TLB entry 400-1 is empty. Thus, during a first iteration over the set of evictable cache lines, the TLB will miss on the first line 100A-1, which will prompt the TLB to fetch the required first VA/PA translation from the MMU. (The TLB will also miss on the second line 100A-2, but there are no more available entries in the TLB, so no further request will be sent to the MMU.)

Once the TLB entry 400-1 has been populated with the requested VA/PA translation for the first line 100A-1, the TLB sends a "linefill" signal to the write buffer controller in order to prompt a second iteration. During the second iteration, the first line 100A-1 will now hit on the updated cache entry 400-1, so that the first line 100A-1 can be evicted and written to page A. The second line 100A-2 will miss.

According to the schemes presented herein, the TLB entry 400-1 will remain unavailable for eviction despite the translation hit on line 100A-1 and the process will then go on during the second iteration to evaluate the third line 100A-3 (which will also hit) and the fourth line 100A-4 (which will miss). Thus, both the first line 100A-1 and the third line 100A-3 hit, and may be evicted and written out to page A together. Only at the end of this iteration is the TLB entry 400-1 unlocked and updated based on the missed second line 100A-2. During the next iteration, both of the remaining lines, i.e. the second line 100A-2 and the fourth line 100A-4 hit on the updated TLB entry 400-1 and may thus be evicted.

By contrast, in a conventional system, the translation hit on line 100A-1 would cause the TLB entry 400-1 to be marked as available for eviction and the subsequent miss on the second line 100A-2 would cause the TLB entry 400-1 to be evicted and replaced with the second VA/PA translation for the second line 100A-2. Thus, during the second iteration, only the first line 100A-1 would be evicted. The process would then stall waiting for the TLB entry 400-1 to be updated to add the second VA/PA translation for the second line 100A-2. Once the TLB entry 400-1 has been updated to add the second VA/PA translation required for the second line 100A-2, the second line 100A-2 may be evicted on the next iteration, but the third line 100A-3 would miss, and the process would then stall waiting for the required VA/PA translation for the third line 100A-3, which in this example is the same first VA/PA translation as for the first line 100A-1 that was added during the first iteration. The cycle would then have to be performed again with this TLB entry 400-1 again being evicted and replaced with the VA/PA translation for the fourth line 100A-4, and so on. Thus, the TLB entry 400-1 goes through a HIT->EVICT->MISS->FETCH->HIT cycle wherein the same VA/PA translation is repeatedly fetched/evicted, even though both of the first and third lines could have hit during the first iteration (i.e. by following the scheme presented in FIG. 3). This phenomenon is known as 'thrashing'. The scheme presented in FIG. 3 may help to avoid, or reduce the likelihood, of such thrashing.

As mentioned above, in the schemes presented herein, each of the entries 400 in the address-translation cache 40 remains locked during the iteration, and are only made available to be updated once each of the evictable lines has been processed using the current list of entries in the address-translation cache 40. To facilitate this, in the present embodiments, each entry in the address-translation cache 40 may have possible four states: 'INVALID', 'LOCKED', 'UNLOCKING' and 'VALID'. The current state of the entry may generally be indicated by the status field 401, as shown in FIG. 2.

Figure 4:
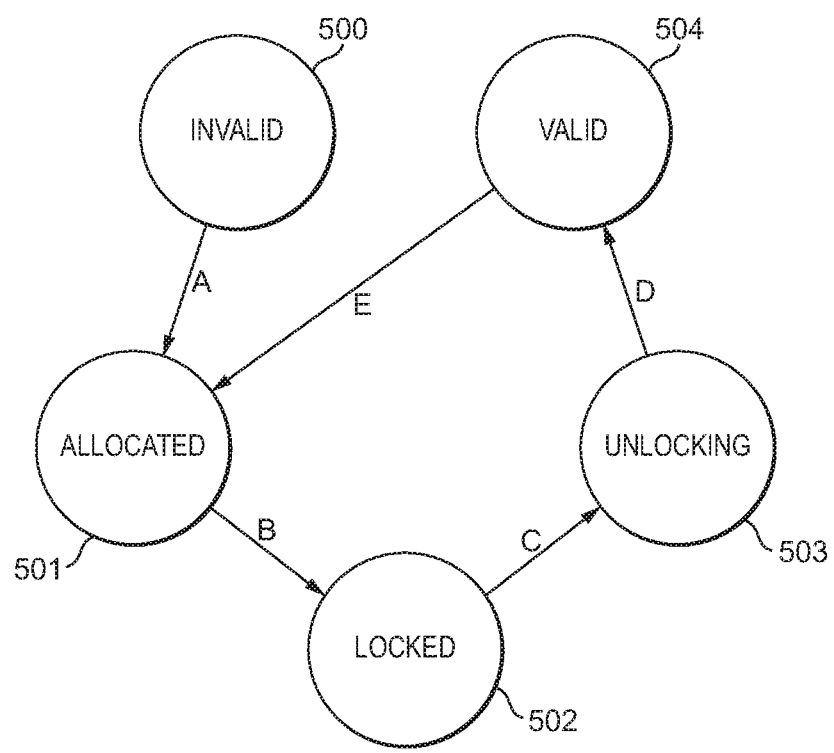
FIG. 4 illustrates the state progression of the entries in the address-translation cache (which may e.g. comprise a TLB) according to the technology presented herein.

The state progression of an entry in the address-translation cache 40 is illustrated in FIG. 4. Initially, as no valid data is present, the entry of the address-translation cache may be in the INVALID state 500. Once the entry has been allocated but whilst data is being fetched from the MMU to populate the entry, so that the entry does not yet contain any valid data, that entry may optionally move into the ALLOCATED state 501 (Step A). The entry then moves into the LOCKED state 502 (Step B) once valid data has been placed into the entry. It will be appreciated that the ALLOCATED state is optional and, in some examples, the entries may remain in the INVALID state 501 until valid data has been placed into the entry (so that the entry moves directly into the LOCKED state 502). An entry will generally remain in the LOCKED state 502 until that entry has been used during an iteration. Once the entry has been used, i.e. in the event of a translation hit on that entry, the entry may then be made available for eviction at the end of the iteration. However, during the iteration, any entries of the address-translation cache that are in the LOCKED state 502 are prevented from moving into a VALID state 504, so that such states remain unavailable for eviction until the end of the iteration. For instance, in the present embodiments, as soon as an iteration over the set of evictable lines is triggered, so that a translation for all evictable lines is requested, e.g. in the manner explained above in relation to FIG. 3, a lock signal is asserted that acts to prevent any of the LOCKED entries from being evicted (i.e. from transitioning into a VALID state) during the iteration. In particular, while the lock signal is being asserted, in the event of a translation hit on an entry of the address-translation cache that is in the LOCKED state, so that the entry is read (and may be returned to the write buffer 10, etc.), that entry is moved from the LOCKED state 502 into an UNLOCKING state 503 (Step C) (and not into the VALID state 504).

In the UNLOCKING state 503, the entry remains "locked" (and unavailable for eviction) until the iteration is completed and all of the cache lines have been processed. Only then, at the end of the iteration, is the lock signal de-asserted at which point all entries in the UNLOCKING state 503 progress to the VALID state 504 (Step D), wherein they may be subsequently evicted to free up an entry in the address-translation cache 40 so that a new VA/PA translation may be added. Thus, in the event of a (the next) translation miss on a subsequent iteration, the entry may be re-allocated and moved from the VALID state 504 to the ALLOCATED state 501 (where one is provided, or otherwise back into a LOCKED state 503 once the new valid data has been added) (Step E).

Thus, the lock signal when asserted causes any entries of the address-translation cache 40 in the LOCKED state 502 that hit during an iteration to be held in an UNLOCKING state 503 until the iteration is complete. Any entries in the address-translation cache 40 that are not used, i.e. do not have any translation hits, remain in the LOCKED state 502 so that they may be used in subsequent iterations. That is, the entries generally remain in the LOCKED state until they have been used at least once. (Other than in exceptional cases—e.g. if the address-translation cache 40 is invalidated, all entries may transition back to the INVALID state 500 from whichever state they are in).

By contrast, a conventional address-translation cache such as a TLB behaves like a cache in that the TLB entries are only locked until a linefill completes and the data is read. Once the data has been read, the TLB entry is unlocked and is available to be evicted on a subsequent translation miss. For example, in some conventional TLB systems, the state progression might move straight from LOCKED to VALID on a translation hit. The TLB entries would thus be available for eviction as soon as a first hit on a VA occurs. So, in the event of the next translation miss, the TLB entry will be replaced with the new VA/PA translation based on the translation miss. The addition of an UNLOCKING state, as described above, thus allows the address-translation cache entries to remain locked until the iteration has completed and all VAs have been checked against it to allow a more efficient use of the address-translation cache entries (and to reduce the problem of 'thrashing' as discussed above).

However, this "deferred" releasing scheme may in turn, in some cases, cause a potential deadlocking of the system. For instance, in the event of a translation miss, new data may be added to an INVALID entry (i.e. as shown in Step A), or where there are no INVALID entries available, one of the VALID entries may be re-allocated (Step E). However, according to the deferred releasing scheme presented herein, any entries in the ALLOCATED, LOCKED or UNLOCKING state are not available for re-allocation. Thus, if there are no INVALID or VALID entries presently available, the address-translation cache 40 cannot be updated in the event of a translation miss, as a request for a missing PA will not be able to allocate an entry and initiate a fetch from the MMU. In this case, a further iteration must be performed to avoid a potential deadlocking of the system. To explain, by way of example, consider now a system comprising an address-translation cache with two entries 400-1, 400-2 and a write cache containing four evictable lines 100A-1, 100A-2, etc., e.g.:

| Cache line | Address-Translation Cache |
|---|---|
| 100A-1 | 400-1 |
| 100A-2 | 400-2 |
| 100A-3 | |
| 100A-4 | |

The address-translation cache 40 is initially empty and both address-translation cache 40 entries are INVALID (or "idle"). During a first iteration, each of the VAs associated with the cache lines 100A-1, 100A-2, etc. in the write cache are presented to the address-translation cache 40 in turn. Because the entries are initially empty, each of the four cache lines returns a translation miss. The first two VAs, associated with the first two cache lines 100A-1, 100A-2, are therefore allocated entries in the address-translation cache 40 and the translation misses generate MMU requests for the VA/PA translations. The write buffer 10 then receives from the address-translation cache 40 the miss status flags and goes into a wait state pending a "linefill" signal from the address-translation cache 40. At some point the MMU returns valid PAs which are written into the corresponding entries in the address-translation cache 40 and the entries are thus moved into the LOCKED state. The address-translation cache 40 in turn generates a "linefill" signal to the write buffer 10 (or the controller associated therewith) which triggers a second iteration.

During the second iteration, all of the VAs associated with cache lines 100A-1, 100A-2, etc. in the write cache are again presented to the address-translation cache 40 but this time the first two VAs hit against the updated entries 400-1, 400-2 of the address-translation cache 40. The states of the address-translation cache 40 entries therefore move to UNLOCKING, as explained above. The second pair of VAs 100A-3, 100A-4 again miss, but because the address-translation cache 40 entries have not yet been unlocked (i.e. are not yet VALID and available for eviction), MMU requests are not yet generated as there are no available entries in the address-translation cache 40. Thus, the master receives from the address-translation cache 40 translation hit responses for the first two cache lines 100A-1, 100A-2 along with the translated PAs. Translation misses are returned for the second two cache lines 100A-3, 100A-4. The system is thus left in a state wherein the address-translation cache 40 has two entries 400-1, 400-2 in the VALID state whilst there are two remaining cache lines 100A-3, 100A-4 that need to be processed. However, because the address-translation cache 40 does not store any information about the translation misses, such that no new MMU requests have been generated (and no linefill signal will be received to trigger a new iteration), the system is now in deadlock. In order to overcome this potential deadlock, the controller may be configured to trigger a new iteration whenever there is a translation hit, i.e. whenever there is an evictable line that can be evicted so that a new miss may be handled.

In general, the iteration, e.g. as shown in FIG. 3, may thus be triggered either by new data becoming available, e.g. a linefill signal being received from the address-translation cache 40, or a new line being added to the record of evictable lines 100A stored in the write cache 12, or in response to a translation hit on a previous iteration. However, it will be appreciated that the iteration may only be triggered in such situations. That is, the write buffer 10 does not need to constantly iterate over all available lines, since if there are no translation hits, there is no need to perform the next iteration until new data (e.g. a linefill signal) is received. Thus, until the next iteration is triggered, the data processing apparatus may remain in an invalid state. The scheme presented herein may therefore also result in improved power consumption as the write buffer 10 need only be operated when there is a possibility of a line being evicted.

The description above generally assumes that the memory transaction may proceed whenever there is a translation hit in the address-translation cache. However, in some cases, there may be "page faults", e.g. where no translation exists for the VA, or where permission flags do not allow for writing. In these cases, alternative or additional schemes may be required in order to resolve the page fault.

As discussed above, a particular example of data transfer to which the present embodiments are particularly applicable is the storing of primitive lists in tile-based graphics processing systems.

Graphics processing is normally carried out by first splitting the scene to be displayed into a number of similar basic components or "primitives", which primitives are then subjected to the desired graphics processing operations. The graphics "primitives" are usually in the form of simple polygons, such as triangles, and are usually described by defining their vertices.

In tile-based rendering, the two-dimensional render output or target (i.e. the output of the rendering process, such as an output frame to be displayed) is rendered as a plurality of smaller area sub-regions, usually referred to as "tiles". The tiles are each rendered separately (typically one-after-another). The rendered tiles are then recombined to provide the complete rendering output (e.g. frame for display). In such arrangements, the render output (output) is typically divided (by area) into regularly-sized and shaped rendering tiles (they are usually e.g., squares or rectangles) but this is not essential.

Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques.

In a tile-based rendering system, it is accordingly usually desirable to be able to identify and know those primitives that are actually present in a given rendering tile so as to, e.g., avoid unnecessarily rendering primitives that are not actually present in a tile. In order to facilitate this, it is known to prepare a list or lists of the primitives to be rendered for each rendering tile (e.g. that will appear in the tile). Such "primitive lists" (which can also be referred to as a "tile lists") identify (e.g. by reference to a primitive indicator) the primitives to be rendered for the tile(s) in question.

Once lists of primitives to be rendered (primitive-lists) for each rendering tile have been prepared, the primitive-lists are stored for use, e.g., to allow the system to identify which primitives need to be considered (and rendered) when rendering the tiles.

Because the primitive lists that are prepared in tile-based graphics processing systems are, in effect, prepared in advance and to completion, before being used for the rasterising and rendering process, and each entry in a given primitive list is independent of any other entries in that primitive list, the Applicants have recognised that the data for a primitive list can, in practice, be written to memory in any order (in time), and the primitive lists will only be used once the complete primitive lists are stored in the memory. Accordingly, the techniques for transferring data to memory used in the technology described herein can be used for writing primitive lists to memory in a tile-based graphics processing system.

Figure 5:
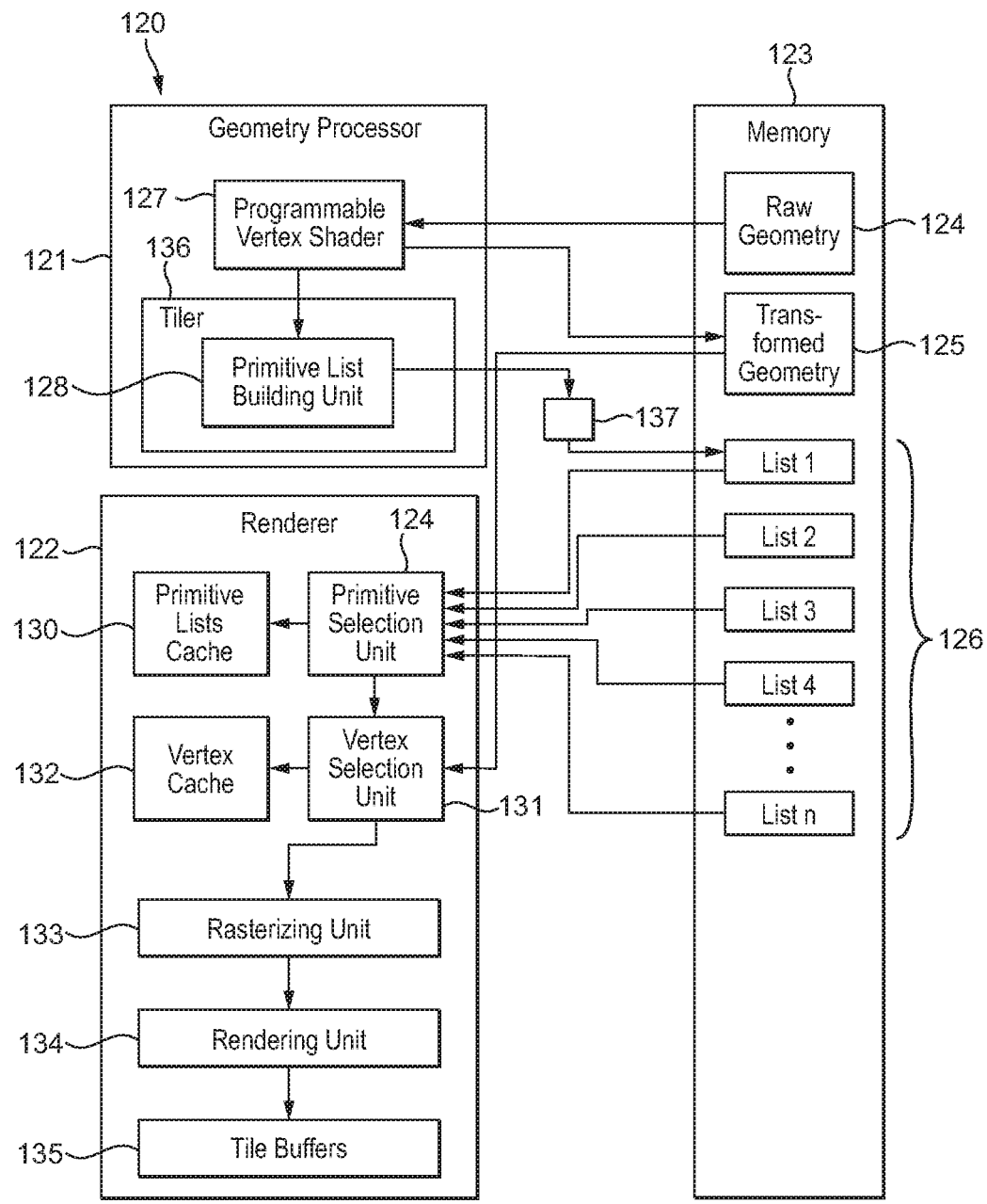
FIG. 5 shows schematically an embodiment of the technology presented herein in a graphics processing system.

FIG. 5 illustrates this, and shows schematically a tile-based graphics processing system that may be operated in accordance with the present embodiments. The graphics processing system includes a graphics processor 120 and a memory 123. The graphics processor 120 includes a geometry processor 121, and a renderer 122, both of which can access the memory 123. The memory 123 may be "on-chip" with the geometry processor 121 and renderer 122, or may be an external memory that can be accessed by the geometry processor 121 and renderer 122.

The memory 123 stores, inter alia, and as shown in FIG. 5, a set of raw geometry data 124 (which is, for example, provided by the graphics processor driver or an API running on a host system (microprocessor) of the graphics processor 120), a set of transformed geometry data 125 (which is the result of various transformation and processing operations carried out on the raw geometry 124), and a set of primitive lists 126. The primitive lists 126 contain data, commands, etc., for the respective primitives. The transformed geometry data 125 comprises, for example, transformed vertices (vertex data), etc.

The geometry processor 121 comprises, inter alia, a programmable vertex shader 127 and a tiler 136. The tiler comprises, inter alia, a primitive list building unit 128.

The programmable vertex shader 127 takes as it input the raw geometry data 124 stored in the memory 123, and processes that data to provide transformed geometry data 125 (which it then stores in the memory 123) comprising the geometry data in a form that is ready for 2D placement in the render output (e.g. frame to be displayed). The programmable vertex shader 127 and the processes it carries out can take any suitable form and be any suitable and desired such processes.

The primitive list building unit 128 of the tiler 136 divides the render target into a plurality of sub-regions for which primitive lists are to be prepared. The sizes of the sub-regions that the render target is divided into can correspond to individual rendering tiles, and/or set of plural rendering tiles, as desired.

Once the render output has been divided into sub-regions for the tiling process, the primitive list building unit 128 begins allocating the primitives to the primitive lists corresponding to those sub-regions. To do this, the primitive list building unit 128 takes as its input the transformed and processed vertex (geometry) data 125 from the programmable vertex shader 127 (i.e. the positions of the primitives in the frame), and builds primitive lists using that data.

As shown in FIG. 5, the primitive lists 126 prepared by the primitive list building unit 128 are stored in the memory 123 by the primitive list building unit 128. As shown in FIG. 5, to do this, the primitive list building unit 128 first writes the primitive list data that it is generating to a write buffer 137 that is configured in, and operates in, the manner of the write buffer of the present embodiments (i.e. as illustrated, for example, in FIG. 2). The primitive list data is then transferred from the write buffer 137 in the manner of the present embodiments to the appropriate primitive list(s) in the memory 123. In this way, the primitive list building unit 128 can simply take each primitive it receives for processing in turn and add it to an appropriate cache line in the write buffer 137, with the write buffer 137 then acting to merge primitives written for a given primitive list at different times into the appropriate list 126 in the memory 123.

Once the primitive listing process is complete, and the complete primitive lists 126 for the render output are stored in the memory 123, the renderer 122 can (and will) use the primitive lists 126 to generate the render output.

As shown in FIG. 5, the renderer 122 includes a primitive selection unit 129, a primitive list cache 130, a vertex selection unit 131, a vertex data cache 132, a rasterising unit 133, a rendering unit 134, and tile buffers 135.

The rasterising unit 133, rendering unit 134, and tile buffers 135 operate, in this embodiment, in the usual manner for such units in graphics processing systems. Thus the rasterising unit 133 takes as its input a primitive and its vertices, rasterises the primitive to fragments, and provides those fragments to the rendering unit 134. The rendering unit 134 then performs a number of rendering processes, such as texture mapping, blending, shading, etc. on the fragments, and generates rendered fragment data which it stores in the tile buffers 135 for providing to an output render target, such as a frame buffer for a display.

The primitive selection unit 129 of the renderer 122 determines which primitive is to be rendered next. It does this by considering the primitive lists 126 stored in the memory 123, and selecting from one of those lists the next primitive to be rendered.

The primitive selection unit 129 can also place one or more primitive lists in a primitive list cache 130.

The primitive selection unit 129 provides the primitive that it has selected for rendering next to the vertex selection unit 131. In response to this, the vertex selection unit 131 retrieves the appropriate transformed vertex data for the primitive in question from the transformed geometry data 125 stored in the memory 123, and then provides the primitive (i.e. its transformed vertex data) to the rasterising unit 133 for processing. The vertex selection unit 131 can cache vertex data that it has retrieved from the memory 123 in the vertex data cache 132, if desired.

As discussed above, the rasterising unit 133 then rasterises the primitive to fragments, and provides those fragments to the rendering unit 134 for rendering. The rendering unit 134 performs a number of rendering processes, such as texture mapping, blending, shading, etc. on the fragments, to generate rendered fragment data for the fragments representing the primitive, and stores the rendered fragment data in the tile buffers 135 for providing to an output render target, such as a frame buffer for a display.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:
1. A data processing apparatus comprising:
a write buffer including a write cache containing a plurality of lines for storing data to be written to memory, wherein the write buffer maintains a record of a set of lines of the write cache that are available to be evicted to memory, each evictable line having an associated virtual address indicating where the data in the line is to be stored in memory; and
an address-translation cache storing as virtual address to physical address translation entries a list of virtual address to physical address translations;
wherein the write buffer is operable to process the evictable lines in the record of evictable lines by requesting from the address-translation cache a respective physical address for each virtual address associated with an evictable line, wherein in the event that the respective virtual address to physical address translation is present in the address-translation cache, the address-translation cache returns a hit status to the write buffer, whereas in the event that the respective virtual address to physical address translation is not present in the address-translation cache, the address-translation cache returns a miss status to the write buffer;
and wherein:
the write buffer is configured to write out to memory at least one of the evictable lines for which a hit status is returned;
the write buffer is operable to iterate over the set of evictable lines so that, in an iteration, each evictable line in the record of evictable lines is processed;
and the address-translation cache is operable:
to, upon valid data being placed into a virtual address to physical address translation entry of the address-translation cache, set that entry to a locked state in which the data in the entry cannot be removed from the address-translation cache;
and such that when the respective virtual address to physical address translation stored in a locked virtual address to physical address translation entry of the address-translation cache is requested during an iteration, the data in that entry remains prevented from being removed from the address-translation cache until the iteration over the set of evictable lines is complete.

2. The data processing apparatus of claim 1, wherein:
when the respective virtual address to physical address translation stored in a locked entry is requested during an iteration, that virtual address to physical address translation entry in the address translation cache is set to a state that indicates that that entry in the address translation cache is locked until the iteration over the set of evictable lines is complete, but can be replaced once the iteration over the set of evictable lines is complete.

3. The data processing apparatus of claim 1, wherein the address-translation cache is operable to, so long as there is an available entry in the address-translation cache, update its stored list of virtual address to physical address translations during an iteration to add a virtual address to physical address translation for one or more evictable lines for which a miss status is returned during the iteration.

4. The data processing apparatus of claim 1, wherein the evictable lines of the set of evictable lines are processed in turn.

5. The data processing apparatus of claim 1, wherein when the respective virtual address to physical address translation is present in the address-translation cache, the address-translation cache returns the requested physical address to the write buffer so that the write buffer is operable to write out the evictable line and the associated physical address to memory.

6. The data processing apparatus of claim 5, wherein the address-translation cache also returns associated data or attributes to the write buffer along with the requested physical address.

7. The data processing apparatus of claim 1, wherein the address-translation cache does not support hit-under-miss functionality.

8. The data processing apparatus of claim 1, wherein the write buffer is configured to start processing the evictable lines in response to a triggering event.

9. The data processing apparatus of claim 8, wherein the triggering events comprise one or more of:
   a new line being added to the record of evictable lines of the cache;
   a new virtual address to physical address translation being included in the list of virtual address to physical address translations stored in the address-translation cache;
   the address-translation cache returning a hit status to the write buffer during a processing iteration over the set of evictable lines.

10. The data processing apparatus of claim 1, wherein the data that is being written to memory comprises lists of primitives for use in a tiled-based graphics processing system.

11. A data processing system comprising one or more processing units, a memory, and a data processing apparatus as claimed in claim 1, wherein data is written from the one or more processing units into the write cache.

12. A method of writing data to memory in a data processing apparatus that comprises a write buffer including a write cache containing a plurality of lines for storing data to be written to memory and an address-translation cache that stores as virtual address to physical address translation entries a list of virtual address to physical address translations;
   the method comprising:
   maintaining a record of a set of lines of the write cache that are available to be evicted to memory, each evictable line having an associated virtual address indicating where the data on the line is to be stored in memory; and
   processing the evictable lines in the record of evictable lines by requesting from the address-translation cache a respective physical address for each virtual address associated with an evictable line, wherein in the event that the respective virtual address to physical address translation is present in the address-translation cache, the address-translation cache returns a hit status to the write buffer, whereas in the event that the respective virtual address to physical address translation is not present in the address-translation cache, the address-translation cache returns a miss status to the write buffer; and
   in response to a hit status being returned for at least one of the evictable lines, writing out from the write buffer to memory at least one of the evictable lines for which a hit status is returned; and
   wherein the write buffer is operable to iterate over the set of evictable lines so that, in an iteration, each evictable line in the record of evictable lines is processed;
   the method further comprising:
   when valid data is placed into a virtual address to physical address translation entry of the address-translation cache, setting that entry to a locked state in which the entry cannot be changed or removed from the address-translation cache; and
   when a respective virtual address to physical address translation stored in a locked entry is requested during an iteration, preventing the data in that virtual address to physical address translation entry being removed from the address translation cache until the iteration over the set of evictable lines is complete.

13. The method of claim 12, comprising:
   when the respective virtual address to physical address translation stored in a locked entry is requested during an iteration, setting that virtual address to physical address translation entry in the address translation cache to a state that indicates that that entry in the address translation cache is locked until the iteration over the set of evictable lines is complete, but can be replaced once the iteration over the set of evictable lines is complete.

14. The method of claim 12, comprising the address-translation cache updating its stored list of virtual address to physical address translations during an iteration to add a virtual address to physical address translation for one or more evictable lines for which a miss status is returned during the iteration.

15. The method of claim 12, wherein when the respective virtual address to physical address translation is present in the address-translation cache, the address-translation cache returns the requested physical address to the write buffer so that the write buffer is operable to write out the evictable line and the associated physical address to memory.

16. The method of claim 15, comprising the address-translation cache also returning associated data or attributes to the write buffer along with the requested physical address.

17. The method of claim 12, comprising the write buffer starting processing the evictable lines in response to a triggering event, wherein the triggering events comprise one or more of:
   a new line being added to the record of evictable lines of the cache;
   a new virtual address to physical address translation being included in the list of virtual address to physical address translations stored in the address-translation cache;
   the address-translation cache returning a hit status to the write buffer during a processing iteration over the set of evictable lines.

18. A non-transitory computer readable storage medium storing software code that when executing on a data processor performs a method of writing data to memory in a data processing apparatus that comprises a write buffer including a write cache containing a plurality of lines for storing data to be written to memory and an address-translation cache that stores as virtual address to physical address translation entries a list of virtual address to physical address translations;
   the method comprising:
   maintaining a record of a set of lines of the write cache that are available to be evicted to memory, each evictable line having an associated virtual address indicating where the data on the line is to be stored in memory; and processing the evictable lines in the record of evictable lines by requesting from the address-translation cache a respective physical address for each virtual address associated with an evictable line, wherein in the event that the respective virtual address to physical address translation is present in the address-translation cache, the address-translation cache returns a hit status to the write buffer, whereas in the event that the respective virtual address to physical address translation is not present in the address-translation cache, the address-translation cache returns a miss status to the write buffer; and in response to a hit status being returned for at least one of the evictable lines, writing out from the write buffer to memory at least one of the evictable lines for which a hit status is returned; and wherein the write buffer is operable to iterate over the set of evictable lines so that, in an iteration, each evictable line in the record of evictable lines is processed;

the method further comprising:

when valid data is placed into a virtual address to physical address translation entry of the address-translation cache, setting that entry to a locked state in which the entry cannot be changed or removed from the address-translation cache; and when a respective virtual address to physical address translation stored in a locked entry is requested during an iteration, preventing the data in that virtual address to physical address translation entry being removed from the address translation cache until the iteration over the set of evictable lines is complete.

* * * * *